April 15, 1969 G. KLEIN 3,439,305
MAGNETIC COIL HAVING CONDUCTOR TURNS ARRANGED ACCORDING TO THE LINES OF FORCE OF THE MAGNETIC FIELD WHICH THE COIL CREATES
Filed Jan. 6, 1965 Sheet 1 of 6

Inventor:
George Klein
by:
Edwin E. Greigg

April 15, 1969 G. KLEIN 3,439,305

MAGNETIC COIL HAVING CONDUCTOR TURNS ARRANGED ACCORDING TO THE LINES OF FORCE OF THE MAGNETIC FIELD WHICH THE COIL CREATES

Filed Jan. 6, 1965 Sheet 5 of 6

April 15, 1969 G. KLEIN 3,439,305
MAGNETIC COIL HAVING CONDUCTOR TURNS ARRANGED ACCORDING TO THE LINES OF FORCE OF THE MAGNETIC FIELD WHICH THE COIL CREATES
Filed Jan. 6, 1965

United States Patent Office 3,439,305

Patented Apr. 15, 1969

3,439,305

MAGNETIC COIL HAVING CONDUCTOR TURNS ARRANGED ACCORDING TO THE LINES OF FORCE OF THE MAGNETIC FIELD WHICH THE COIL CREATES

Georges Klein, Paris, France, assignor to Compagnie Generale d'Electricite, Paris, France, a corporation of France Filed Jan. 6, 1965, Ser. No. 423,793
Claims priority, application France, Jan. 6, 1964, 959,448
Int. Cl. H01f *5/00, 27/28*
U.S. Cl. 335—299 12 Claims

ABSTRACT OF THE DISCLOSURE

A magnetic coil for use with a low frequency high intensity current which is made up of plural layers, each layer being wound on a support representing a tube of force of the internal magnetic field of the coil. The coil may inscribe a revolution in which any meridian plane inside a line of force of the field which the coil creates and in any point of its periphery, the magnetic field vector will be tangential to the coil.

This invention relates to magnetic coil construction and, more particularly, to methods and apparatus for substantially reducing unwanted forces in specific coil configurations.

It is known that, in theory, the cylindrical coils assumed to be infinite in length would be inscribed in their lines of force and would have the property of being subjected only to merely radial electromagnetic forces.

In such a coil, the magnetic field is always parallel to the axis of the winding and there is no force in the direction of the field.

In practice, a coil finite in length, the curvature of the lines of forces of the magnetic field creates radial components of the field and compressive forces.

The general purpose of this invention is to overcome these difficulties and to reduce to a large extent the compressive forces.

It is an object of this invention to provide a coil made up of several layers, each layer or group of layers being wound on a support materializing a tube of force of the internal magnetic field of the coil.

According to another feature, the coil is made up of pie-windings, each winding being wound on a support materializing the surface orthogonal to the tubes of force of the internal magnetic field, inside the coil, i.e., in the case of a coil of revolution, a surface the meridian line of which is a line orthogonal to the lines of force of the field.

According to another feature, the coil is a coil of revolution and it is inscribed, in any meridian plane, inside a line of force of the field which it must create and in any point of its periphery, the magnetic field vector is tangential to the coil.

According to another feature, to create a given configuration of the magnetic field, the electromagnetic forces or the current intensity in the coil may be limited to a value selected arbitrarily and may obey a predetermined variation law.

Other features of the invention will be apparent from the following description of embodiments, which are merely illustrative and not limiting in any way, and from the accompanying drawings, wherein.

Figure 1:
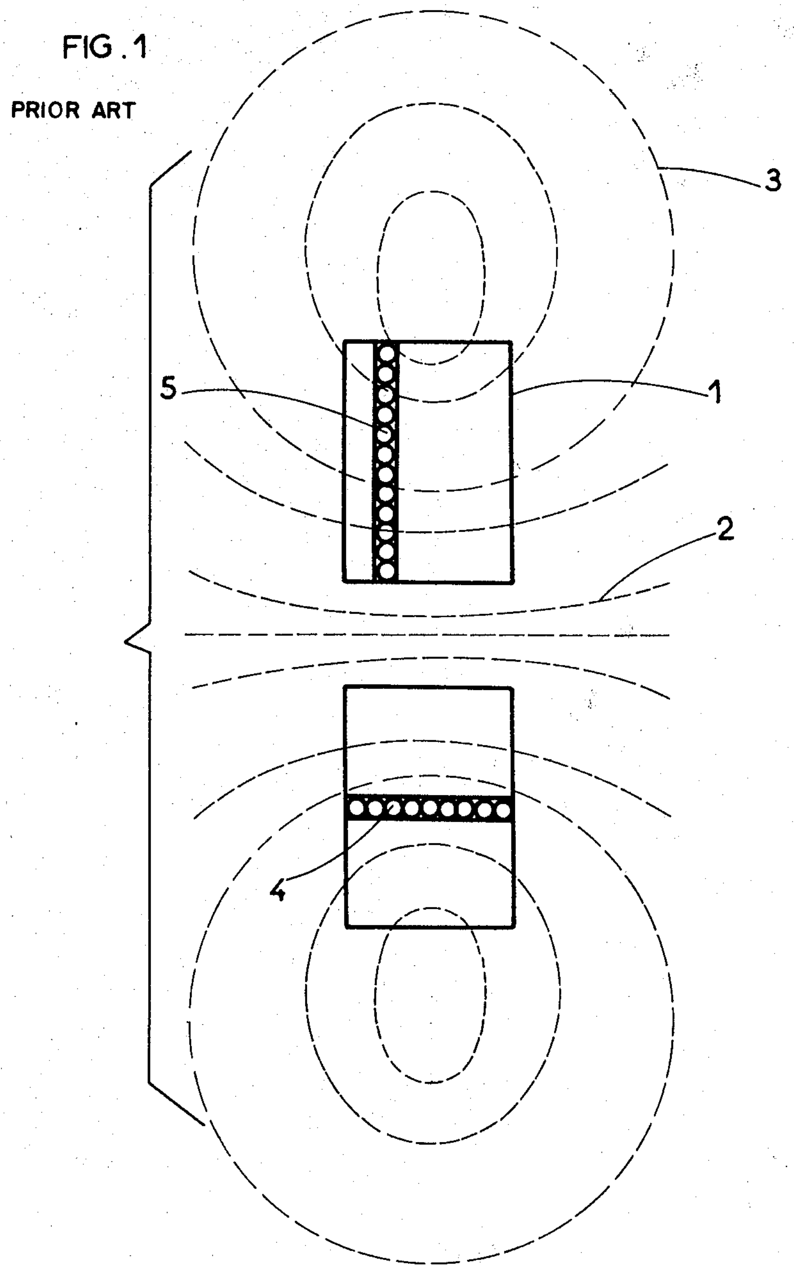
FIG. 1 PRIOR ART
FIG. 1 illustrates the configuration of the lines of force of the magnetic field in a conventional coil.

Referring to FIG. 1, a coil with an external contour 1 creates a magnetic field, the lines of force of which are shown by curves such as 2 and 3, the latter penetrating the coil. In coils according to known prior art, the curvature of the lines of force of the internal magnetic field of the coil creates radial components of the field with reference to the axis of the coil, the conductors being arranged conventionally in cylindrical layers 4 or in flat pies 5. The radial components generate very important compressive forces in the case of intense fields.

This invention permits overcoming these difficulties by using a configuration such as shown in FIG. 1. While retaining the external contour 1 of the coil, a different and appropriate arrangement of the conductors makes it possible to cancel the compressive forces. The current density being calculated by applying a conventional method, it is possible to infer the distribution of the magnetic field inside the coil and to draw the map of the lines of force of the internal magnetic field.

These lines of force accept a family or orthogonal lines, as can be seen from Maxwell equations.

It is very important for the arrangement of the coil according to the invention that these lines of force and their orthogonal lines be determined.

Figure 2:
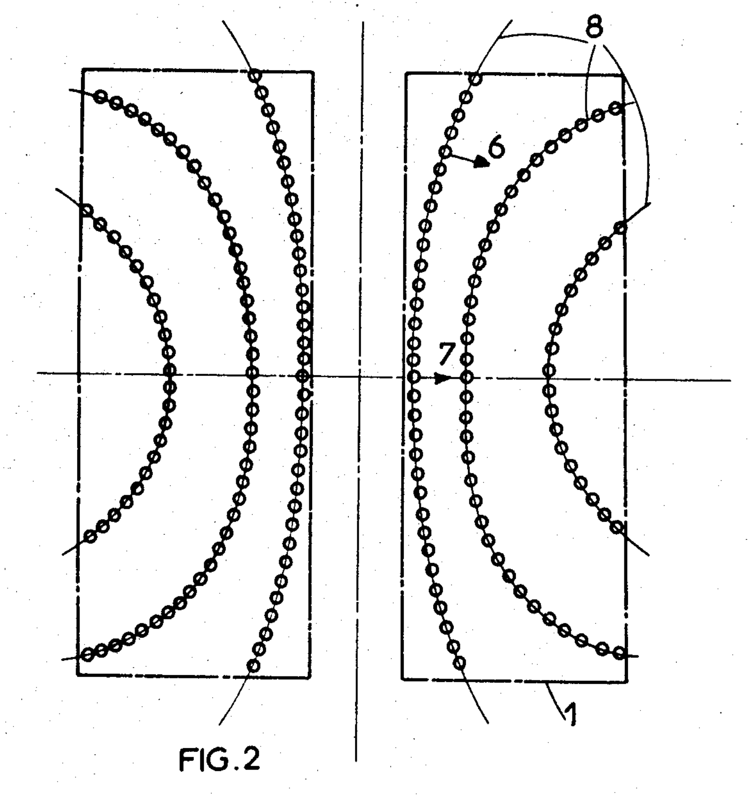
FIG. 2 illustrates a given network of lines of force of the magnetic field and a correlated arrangement of the windings, free from compressive forces, in a meridian plane.

Referring to the given configuration of the magnetic field in FIG. 2, the lines of force of the magnetic field internal to the contour 1 appear, in a meridian plane, as curves 8 and, according to the invention, the conductors are arranged in layers, each layer being wound on a support materializing a tube of force.

In this figure, three layers 8 are shown. The conductors are subjected to forces acting in a perpendicular direction to the magnetic field and to the conductors. The configuration being of revolution, the force is in this meridian plane, perpendicular to the lines of force.

The arrows show the forces to which the conductors are subjected in 6 and in 7. Along a layer, the forces are therefore directed perpendicularly to the layer and there is no tangential force tending to compress the turns of the winding, contrary to the conventional case where the layers are wound on a cylinder.

Figure 3:
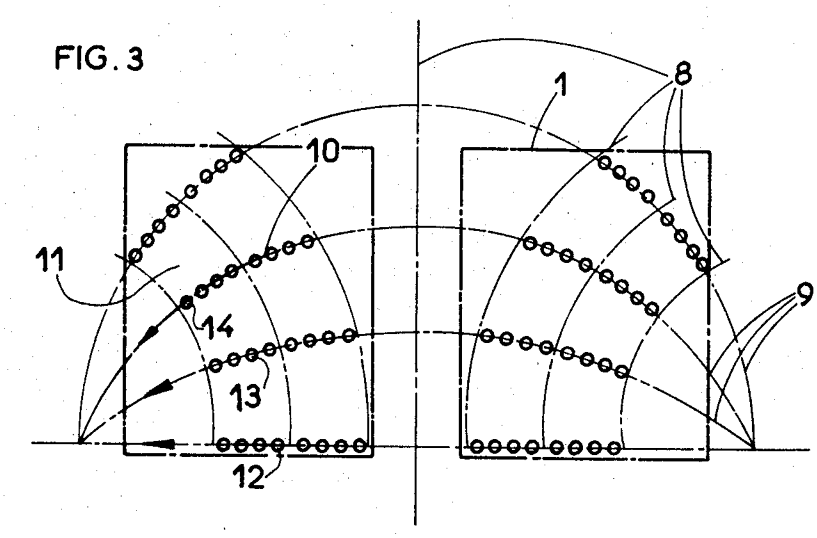
FIG. 3 illustrates a given network of lines of force of the magnetic field and another possible correlated arrangement of the windings, free from compressive forces, in a meridian plane.

In FIG. 3, the lines of force of the magnetic field internal to the contour appear, in a meridian plane, as curves 8 and their orthogonal lines as curves 9.

According to the invention, the conductors are laid in pies having the shape of the surfaces of revolution, the meridian line of which is an orthogonal line to the lines of force of the magnetic field.

In this figure, four pies such as 10 are shown. The forces exerted on the conductors are obtained as previously and are in a tangential direction to the pies, as shown by the arrows for the conductors 12, 13 and 14.

Therefore, there is no attraction forces between two successive pies. This result was theoretically achieved with flat and parallel pies. It is thus possible to bring the pies nearer one to the other and to have a cooling fluid flow in the very thin channels 11 without fearing an obstruction of these channels, should successive pies move closer one to the other under the action of the mutual attraction forces, which exist in the pie-windings of the prior art.

Obviously, a combination of the layers and pies arranged along the tubes of force and the orthogonal surfaces would be possible without departing from the scope of the present invention.

Figure 4:
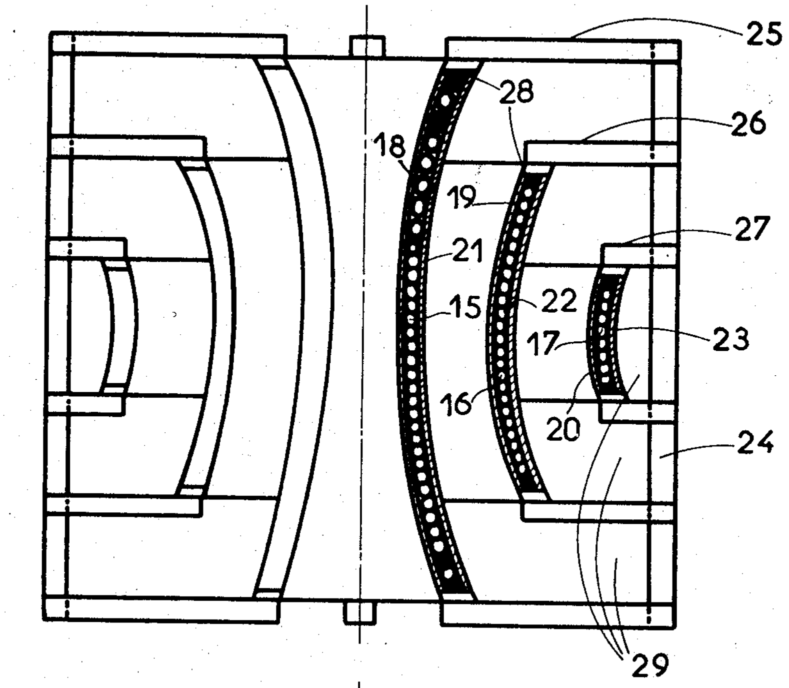
FIG. 4 is a sectional view of a multiple-layer coil according to the invention. To make it clearer, the details of the section are only shown in the right-hand half of the drawing.
Figure 5:
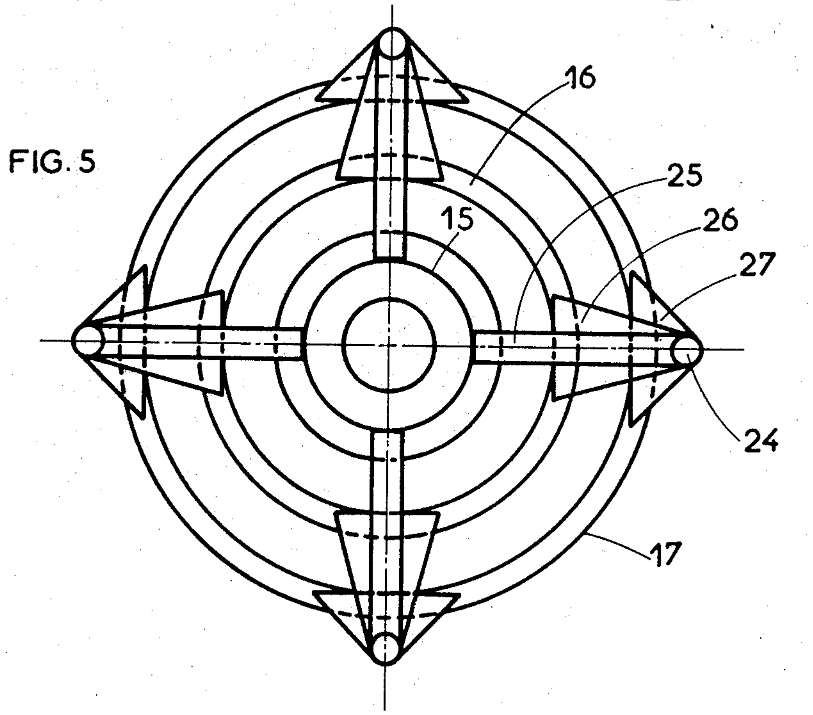
FIG. 5 is a plan view of the winding shown in FIG. 4.

In FIGS. 4 and 5 is shown schematically a multiple-layer coil arranged in accordance with the invention with arrangements which make it possible to utilize the invention under favorable conditions. The applicant may point out that such coils are capable of operating with current densities higher than 100 amps per mm.$^2$ and with power dissipations of 100 watts per cm.$^2$ of conductor in contact with the cooling fluid, when the conductor has resistance. Current densities of several hundreds of amps per mm.$^2$ are possible in the case of superconductors.

The coil shown comprises three layers 15, 16 and 17, wound on three concentric spools 18, 19, 20 which are light components intended only for the installation of the winding. After winding, a resistant surface following the shape of the tubes of force is applied around the winding and against it; this surface is intended for resisting the forces perpendicular to the tubes of force of the magnetic field, and for transmitting these forces outwardly. The curvature of such components shown as 21, 22 and 23 increases their mechanical strength.

The forces may be transmitted outwardly by connecting said resistant components with columns arranged around the winding. In this embodiment, four columns 24 are arranged around the winding and the components 21, 22 and 23 are connected to these columns by means of the legs 25, 26 and 27 which are advantageously located at different heights so as to prevent their transmitting forces mutually.

When designing the coil, a certain distribution of the current density, which thus varies between different points of the coil, is provided for.

In the case of superconductive windings, in order to achieve a variation of the current density in a meridian plane, it is necessary to change the number of turns penetrating it. The current density may vary to a large extent, notably within a 100 to 1 ratio.

Among the processes which may be used, it is possible to place several layers of turns in front of certain areas of the components 21, 22 and 23 and, in front of other areas, in particular at one end of these components, to space out the turns, the free space being occupied, for instance, by shims intended for securing the winding. In this figure, the latter arrangement is shown and shims 28 are placed between the turns.

In the case of non-superconductive windings, the same process may be used but it is also possible to change the diameter or the cross-section area of the wire in some fractions of the coil in order to achieve a variation of the density in the different turns.

The free spaces 29 may be advantageously used for circulating a cooling fluid.

Obviously, this embodiment is given to make the invention clearer and it should not be interpreted as far as the relative dimensions of the layers and free spaces, and the number of layers are concerned.

Figure 6:
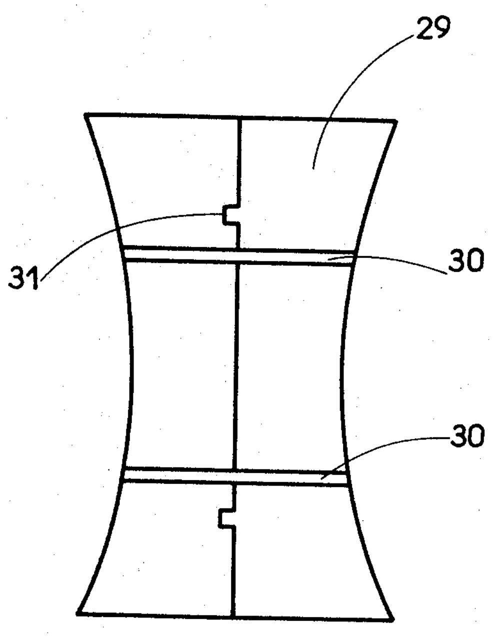
FIG. 6 is an elevation of a possible arrangement for the spools.

FIG. 6 illustrates how a spool or one of the resistant components to be applied against the windings may be constructed. This spool is made up of several shells, for instance of two parts which are brought together before winding and held together by hoops 30, and the position of which is determined by slots and corresponding pins 31. The aforementioned resistant surfaces may be constructed in the same way.

Figure 7:
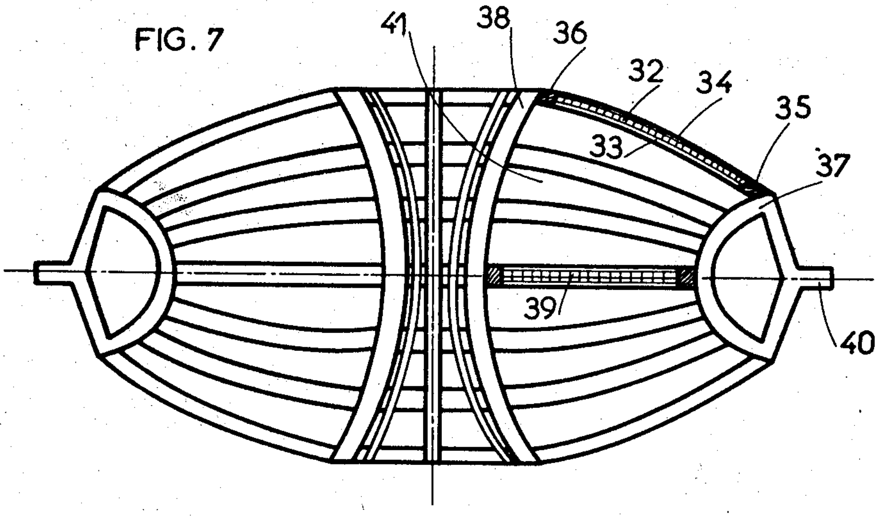
FIG. 7 is a sectional view of a flat coil according to the invention. To make it clearer, the details of the section are partially shown in the right-hand half of the drawing.
Figure 8:
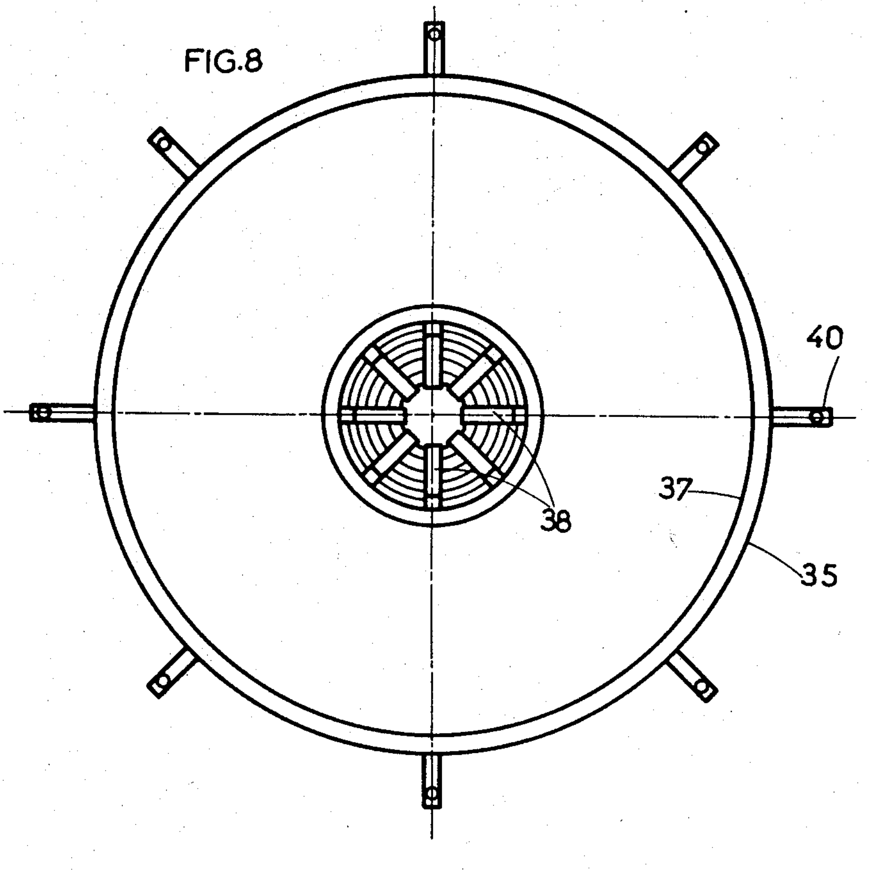
FIG. 8 is a plan view of the coil shown in FIG. 7.

FIGS. 7 and 8 show a pie-winding wherein the pies, except for the pie of the equatorial plane, are cambered and follow the shape of the surfaces orthogonal to the tubes of force.

In this embodiment, the pies are made up of flat wire conductors 32 held between two plates 33 and 34 and two rings 35 and 36. Shims, of appropriate shape, which are not shown, may be disposed between the conductors in order to fill out the free spaces due to the curvature of the surface.

Forces are exerted tangentially to the pie and are applied onto the ring 35.

The other components forming up the pie are only intended for holding the conductors in position and they do not have to carry high forces. However, the part played by these components is not without importance. Actually, if the conductors get out of place, for any reason, the attraction forces between the pies reappear. Thus, it is essential that the conductors be held in position on the surface orthogonal to the tubes of force, save for construction errors.

The pies are held by a device which may be notably made up of braces 37, 38 arranged along the lines of force of the field. The external brace 37 must carry the forces and it may be strengthened by a member 40 intended also for holding the coil and transmitting forces outwardly.

To make the construction arrangements better understood, the intervals 41 between the pies are greatly magnified.

Actually, the invention permits making them very small, while still using them for the cooling fluid flow without fearing their being obstructed as a result of mutual attraction forces between the pies.

Obviously, the above-described processes for achieving a variation of the current density also apply to pie-windings.

It is to be understood that the invention also relates to the combination of the multiple-layer winding along the tubes of force and pie-winding along the orthogonal surfaces.

The above-described embodiments were given only to illustrate the invention but in no way to limit the invention, which covers arrangements in which equivalent means would be used.

More particularly, the layers or pies may comprise several lines of conductors arranged conveniently in order to transmit the forces to which they are subjected. They may utilize the devices described in the patent application "Electric Coil Arrangement With Low Electromagnetic Stresses" filed by the applicant in France on Oct. 31, 1963, Ser. No. 952,449, now Patent No. 1,381,559.

When dealing with plasmas, for instance, if the aim is not only to create intense fields but also to avoid the penetration of the lines of force inside the surface of the coil, in order to avoid particle losses, the invention permits to obtain coils with the characteristics required.

The winding will be designed and constructed so that its external contour be wholly inscribed in the lines of force, hence a tube of force. The separation surface being itself a tube of force, there will be no lines of force penetrating the surface of the coil. Inside the coil, in order to eliminate the compressive forces, the winding will naturally be arranged in layers along the tubes of force or in pies along the orthogonal surfaces in accordance with the description above.

Figure 9:
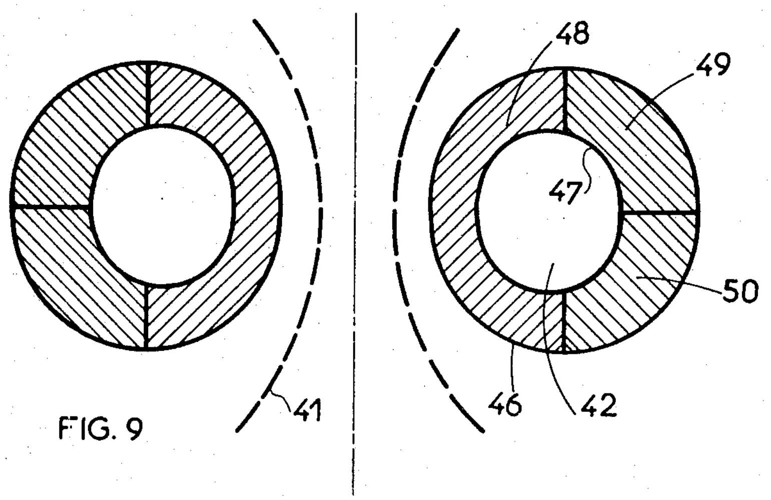
FIG. 9 is a sectional view in the meridian plane of a coil of revolution inscribed on all its periphery in a line of force.
Figure 10:
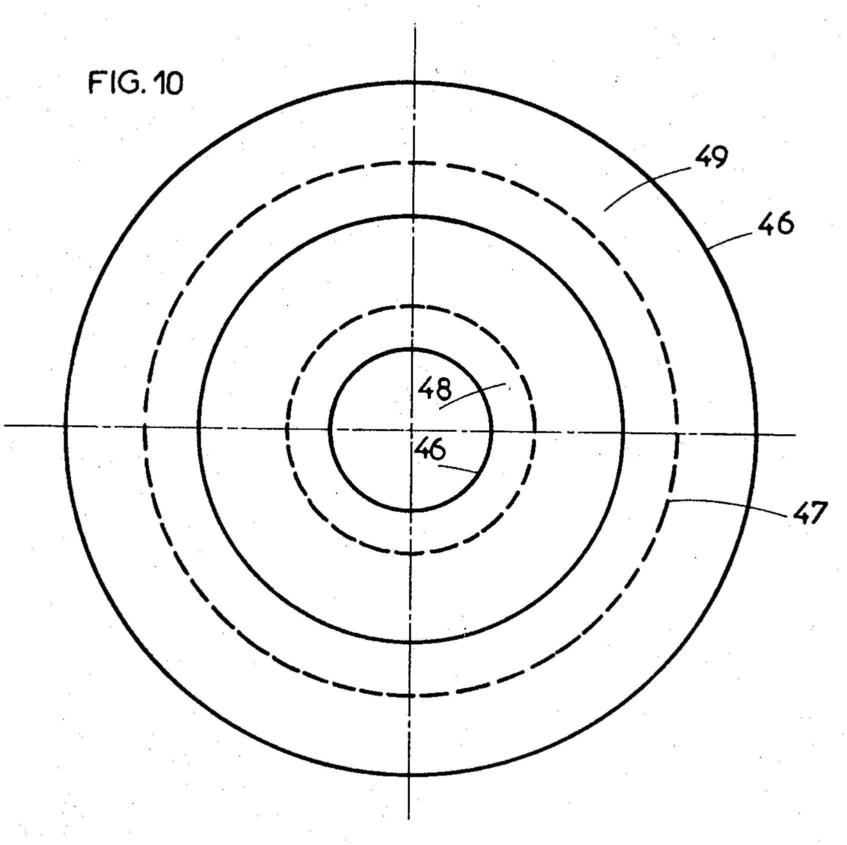
FIG. 10 is a plan view of the coil shown in FIG. 9.

FIGS. 9 and 10 illustrate a configuration of magnetic field, the lines of force of which are visualized by such curves as 41.

For constructing a coil of revolution, the contour of which be wholly inscribed in the lines of force, and which would actually create the magnetic field desired, it is necessary to select beforehand the limit tube of force of the coil which corresponds to the external contour. The contour 46 will be selected according to the space which is to be kept free outside the coil and also according to the electromagnetic forces or current densities which the selection of the contour will entail later on.

$F_1$ being the function corresponding to the flux of the field to be created and $F_2$ the flux of the internal field of the winding, the coil will be inscribed in its lines of force if the curves $F_1$=constant and $F_2$=constant belong to the same family, which will entail the condition wherein:

$$F_2=G(F_1)$$

G being a function to be determined.

In semi-polar coordinates, $\rho$, $\theta$, Z, the axis OZ coinciding with the axis of revolution of the coil, $\mu$ being the permeability of air, the current density is expressed by the equation:

$$j\theta=-\frac{1}{\rho\mu_0}\frac{d^2G}{dF_12}\left[\frac{(\partial F_1)^2}{\partial\rho}+\frac{(\partial F_1)^2}{\partial Z}\right]$$

The force acting on the conductors per unit volume is the vector product:

$$\text{Force}=\vec{j}\wedge\vec{B_2}$$

$B_2$ being the induction corresponding to the flux $F_2$, i.e.:

$$\frac{d^2G}{2}$$

$$\text{Force}=-\frac{\rho}{\mu}\frac{dF_1}{\left(\frac{dG}{dF_1}\right)^2}B_2^3$$

To complete the determination of the coil, it only remains to find a function G, which should meet the following requirements:

On the external limit of the foil $F_2=F_1$;

Therefore $G(F_1)=F_1$.

On this very limit, the fields match and the external and internal fields are identical.

It results that $$\frac{dG(F_1)}{dF_1}=/=1$$

On the internal limit of the coil, which may be decided upon beforehand, the magnetic field must be equal to zero. It results that $$\frac{dG(F_1)}{dF_2}=0$$

By selecting the function G in accordance with the requirements and limits mentioned above, it is possible to obtain a distribution of forces, which will facilitate a technological embodiment.

It is to be understood that other arrangements of the coil might create the same configuration, by moving the limit surfaces of the field of the winding and by changing the current density inside the winding itself.

The coil may advantageously be made up of several parts. To this effect, it will comprise a first coil 48, the action of which predominates for creating the field; a second coil, which may be divided into two components 49 and 50, plays a part which may be compared to that of a compensating coil. These different coils may be constructed in accordance with the arrangements described above.

By splitting the winding into several parts, it is actually possible to arrange the conductors on the whole length of the lines of force without this giving rise to complex technological difficulties.

Advantageously, the internal coil 48, which creates the greater part of flux could be designed by fixing a limit value for the current. That amounts to fixing a limit to the heating if the coil has resistance, or to the local electromagnetic forces. The external coils 49 and 50 may be easily designed and constructed since they operate under low intensity field. As, in this case, the conductors may be in much smaller number than in the internal coil, or be different, it is preferable to separate them from the main coil, which is of different technology.

When aiming at controlling with very great accuracy the configuration and intensity of the magnetic fields, coils following the invention and inscribed in the whole length of the lines of force will be used. In other applications, the creation of particularly intense fields will be of special interest. Up to now, the compressive forces due to the magnetic field acting on the conductors were limiting factors. The windings according to the invention permit a very large increase of the fields which may be obtained.

For technological considerations, it is more convenient, in this case, not to inscribe fully the windings in their lines of force. In other words, the components playing a part similar to that of a compensating coil will be eliminated, the approximation obtained being adequate for practical needs.

Naturally, modifications of the embodiments disclosed herein as merely illustrative but in no way limiting examples may be made without departing from the scope of the invention.

I claim:

1. A magnetic coil for use with a low frequency high intensity direct current and alternating current comprising a plurality of series-connected conductor turns having substantially the same symmetry axis and being placed in a surface of revolution such that at any point of said conductor turns the vector product of a vector tangent to the conductor with a vector tangent to the magnetic curved field lines created by the remaining part of said coil have no oblique component with respect to said surface of revolution.

2. A magnetic coil for use with a low frequency high intensity direct current and alternating current comprising a plurality of series-connected conductor turns having substantially the same symmetry axis and being placed in a surface of revolution such that at any point of said conductor turns the vector product of a vector tangent to the conductor with a vector tangent to the magnetic curved field lines created by the remaining part of said coil have no oblique component with respect to said surface of revolution, and at least one resistant partition means having substantially the shape of a force tube of said curved magnetic field lines, and disposed on the other side of the conductors with respect to said axis for absorbing electromagnetic forces tending to draw said turns away from said axis.

3. A magnetic coil for use with a low frequency high intensity direct current and alternating current comprising a plurality of series-connected conductor turns having substantially the same symmetry axis and being placed in a surface of revolution such that at any point of said conductor turns the vector product of a vector tangent to the conductor with a vector tangent to the magnetic curved field lines created by the remaining part of said coil have no oblique component with respect to said surface of revolution, at least one resistant partition means having substantially the shape of a force tube of said curved magnetic field lines disposed on the other side of the conductors with respect to said axis for absorbing electromagnetic forces tending to draw said turns away from said axis, said conductor turns being distributed in a plurality of spaced coil layers respectively placed in a plurality of surfaces of revolution substantially defined by force tubes of said curved magnetic field lines created by said coils, and each of said layers being provided with a corresponding one of said resistant partition means.

4. A magnetic coil for use with a low frequency high intensity direct current and alternating current comprising a plurality of series-connected conductor turns having substantially the same symmetry axis and being placed in a surface of revolution such that at any point of said conductor turns the vector product of a vector tangent to the conductor with a vector tangent to the magnetic curved field lines created by the remaining part of said coil have no oblique component with respect to said surface of revolution, at least one resistant partition means having substantially the shape of a force tube of said curved magnetic field lines disposed on the other side of the conductors with respect to said axis for absorbing electromagnetic forces tending to draw said turns away from said axis, said conductor turns being distributed in a plurality of spaced coil layers respectively placed in a plurality of surfaces of revolution substantially defined by force tubes of said curved magnetic field lines created by said coils, each of said layers being provided with a corresponding one of said resistant partition means and each of said partition means being supported by a strain member abutting against a fixed outer frame.

5. A magnetic coil for use with a low frequency high intensity direct current and alternating current comprising a plurality of series-connected conductor turns having substantially the same symmetry axis and being placed in a surface of revolution such that at any point of said conductor turns the vector product of a vector tangent to the conductor with a vector tangent to the magnetic curved field lines created by the remaining part of said coil have no oblique component with respect to said surface of revolution, at least one resistant partition means having substantially the shape of a force tube of said curved magnetic field lines disposed on the other side of the conductors with respect to said axis for absorbing electromagnetic forces tending to draw said turns away from said axis, said conductor turns being distributed in a plurality of spaced coil layers respectively placed in a plurality of surfaces of revolution substantially defined by force tubes of said curved magnetic field lines created by said coils, each of said layers being provided with a corresponding one of said resistant partition means, and an inner mandrel for positioning the conductor turns of each of said layers.

6. A magnetic coil for use with a low frequency high intensity direct current and alternating current comprising a plurality of series-connected conductor turns having substantially the same symmetry axis and being placed in a surface of revolution such that at any point of said conductor turns the vector product of a vector tangent to the conductor with a vector tangent to the magnetic curved field lines created by the remaining part of said coil have no oblique component with respect to said surface of revolution, at least one resistant partition means having substantially the shape of a force tube of said curved magnetic field lines disposed on the other side of the conductors with respect to said axis for absorbing electromagnetic forces tending to draw said turns away from said axis, said conductor turns being distributed in a plurality of spaced coil layers respectively placed in a plurality of surfaces of revolution substantially defined by force tubes of said curved magnetic field lines created by said coils, each of said layers being provided with a corresponding one of said resistant partition means, an inner mandrel for positioning the conductor turns of each of said layers, and each layer of said conductor turns being enclosed in a chamber the lateral walls of which are defined by the partition means and the corresponding inner mandrel.

7. A magnetic coil according to claim 6, wherein consecutive chambers are spaced to define an area therebetween for the circulation of a cooling fluid.

8. In a magnetic coil having a tubular internal magnetic field substantially defined by curved lines of force, a plurality of pies formed of coils, and each of said pies forming a surface orthogonal to the trajectory of said lines of force of said internal magnetic field.

9. In a magnetic coil according to claim 8, wherein the pies are disposed between the elements defining said orthogonal surfaces, said elements maintaining the coils in place and said pies being surrounded by at least one circular element one of said circular elements located at the exterior of the pie and supporting the forces of the coils whereby the resultant of these forces are transmitted to the exterior of the coil.

10. In a magnetic coil according to claim 8, wherein successive pies are spaced from each other.

11. In a magnetic coil according to claim 8, wherein said coil encloses a space in which the field has a value of zero.

12. In a magnetic coil, at least part of said coil consisting of a plurality of series-connected conductor turns having substantially the same symmetry axis and being placed in a surface of revolution which is orthogonal to the magnetic field lines created by the remaining part of said coil and such that at any point of said conductor turns the vector product of a vector tangent to the conductor with a vector tangent to said magnetic field lines have no oblique component with respect to said surface of revolution.

References Cited

UNITED STATES PATENTS

| | | | |
|---|---|---|---|
| 789,463 | 5/1905 | Thomson | 336—225 |
| 1,825,105 | 9/1931 | Terman | 336—225 |
| 2,442,274 | 5/1948 | Mallet | 336—60 |

GEORGE HARRIS, *Primary Examiner.*

U.S. Cl. X.R.

335—300; 336—225

PO-1050
(5/69)

UNITED STATES PATENT OFFICE
CERTIFICATE OF CORRECTION

Patent No. 3,439,305 Dated April 15, 1969

Inventor(s) Georges Klein

It is certified that error appears in the above-identified patent and that said Letters Patent are hereby corrected as shown below:

In Column 5, line 41, "foil" should read -- coil --; in Column 5, line 55, the lower portion of the equation should read -- $dF_1$ --; in Column 8, line 24 (Claim 9), "between the elements" should read -- between two elements --

SIGNED AND SEALED
FEB 3 1970

(SEAL)
Attest:

Edward M. Fletcher, Jr.
Attesting Officer

WILLIAM E. SCHUYLER, JR.
Commissioner of Patents